United States Patent [19]

Ahlberg, Jr. et al.

[11] Patent Number: 4,925,557
[45] Date of Patent: May 15, 1990

[54] MULTI-PURPOSE ROTATING MEMBRANE FILTER

[76] Inventors: Walter F. Ahlberg, Jr., 7518 Buegoyne #343, Houston, Tex. 77063; Joseph F. Long, 1335 Lost Creek Blvd., Austin, Tex. 78746

[21] Appl. No.: 338,098

[22] Filed: Apr. 14, 1989

[51] Int. Cl.$^5$ .............................................. B01D 13/00
[52] U.S. Cl. ........................... 210/321.68; 210/333.01; 210/456
[58] Field of Search .............. 210/333.01, 412, 321.68, 210/331, 456

[56] References Cited

U.S. PATENT DOCUMENTS

| | | | |
|---|---|---|---|
| 3,997,447 | 12/1976 | Breton et al. | 210/412 X |
| 4,077,887 | 3/1978 | Langvik | 210/331 |
| 4,698,156 | 10/1987 | Bumpers | 210/333.01 X |
| 4,767,534 | 8/1988 | Ziller | 210/331 |

Primary Examiner—Frank Spear
Attorney, Agent, or Firm—Joseph F. Long

[57] ABSTRACT

A multi-purpose rotating membrane filter unit wherein the central portion of hollow filter discs covered with controlled pore size membranes communicate with the interior of the hollow rotating mounting shaft with the membrane surface of the rotating disc being kept clean by speed of rotation and, in some cases intermittent back flushing, and with filtrate draw off thru the hollow rotating mounting shaft.

9 Claims, 2 Drawing Sheets

MULTI-PURPOSE ROTATING MEMBRANE FILTER

BACKGROUND OF THE INVENTION

There continues to be a need for a continuous filter that, with little operator attention, will filter out particles as small as 0.45 microns. Most bacteria will be filtered out with a 0.45 micron pore size filter. The present invention covers use of a rotating, hollow, disc filter in which the disc may be covered with a membrane containing pores or openings of a controlled size that may be smaller than 0.3 microns.

We have considered the generalized patent issued to Breton, Ser. No. 3,997,447 which covers use of a rotating disc in a filter unit but differs in several unique aspects.

The present invention is intended to provide a unit that may be easily changed to cover many filtration needs. The objectives, then, of this invention include:

1. a filter that may with differing controlled pore-size plastic or sintered metal membrane covered rotating elements be used for such diverse purposes as filtering out bacteria, filtering oil out of water to extent of less than 0.1 ppm. oil remaining, filtering tails from beer manufacture to recover more of the desired product, filtering algae and fungi from water etc., etc.
2. a filter that will operate with very little back flushing and with very little, if any, manual cleaning for most operations
3. a low maintenance filter using well tested mechanical seals and corrosion resistant materials
4. a filter system with multiple filters and instrumentation to indicate leakage so that maintenance of one filter unit will reduce but not stop the flow to the system
5. a relatively low cost filter system.

To achieve these objectives the invention comprises hollow membrane covered discs mounted on a vertical hollow shaft in a cylindrical vessel; with means to rotate the shaft with discs installed and means to draw filtrate out of the center of the vertical hollow mounting shaft; and means to remove solids from the lower portion of the vessel and to draw lighter liquid fluids such as oil or lighter flocculent solids from the top of the vessel.

The hollow filter discs may be fabricated with the base of triangular shaped stiffener ribs welded to a central cylindrical hub containing vertical vent pipes and containing openings that will be adjacent to openings in a hollow rotatable mounting shaft when a plurality of discs are stacked vertically on the mounting shaft. One or more, usually four, vent pipes are formed in each hub. The ribs may be covered with a sintered metal layer or membrane which may have more or less controlled pore size of 2 to 50 microns or more. The sintered metal membrane on each side of the hollow disc being formed is also welded to the central cylindrical hub and the peripheral edges of the sintered metal membrane may be welded to each other or may be welded to an open metal "half pipe" or bead to form an expansion joint or may be clamped. Finally the sintered metal may be covered with a controlled porosity membrane that adheres to the sintered metal.

Note we have described one way of making the membrane covered disc. The disc may also be made by properly clamping the support metal and sintered metal membrane and controlled pore size plastic membranes together. The method of manufacture must be such as to have a disc that allows liquid to move into the center only thru the controlled pore-size sintered metal or plastic membrane, or thru both membranes and that maintains its structural integrity thru temperature change, rotation, and up to 150 p.s.i. pressure differential.

Feed liquid is introduced thru a feed manifold with a maximum of one feed line from the manifold between each adjacent pairs of discs. With the discs rotating the drag from each disc will cause the total mass of liquid to rotate so that as feed is jetted between plates, the heavier materials will be thrown outward by centrifugal force. The rotating disc is normally rotated at a speed to allow only a thin static layer at the surface of the disc. The disc surface speed will be greatest at the periphery and least at the hub. The shaft size, disc size, rotational speed and viscosity of the liquid being filtered are all interrelated with the thickness of the static layer on each side of an operating disc. Some experimentation is necessary to optimize these variables for each feedstock.

Vent pipes thru the hub of each disc allow lighter oils to travel to the top of the vessel to be drawn off. With 10 psi pressure differential across a disc membrane with 0.5 micron pore size and 4" shaft with a 16" disc and 2000 rpm speed we have demonstrated filtration rates of 4 to 10 gallons per square foot of filter area per minute when filtering less than 2 ppm oil out of water.

Periodic cleaning of the filter discs may be accomplished using a centrufugal pump to pump filtrate back thru the hollow rotating shaft and thru the internal hollow disc upwards thru the membrane to dislodge any accumulation on the membrane. A draw off at the bottom of the unit may be valved back into the feed tank. The system may be simply automated to provide for cleaning when flow is restricted to a predetermined percentage of what is normal feed for a clean system or could be automated to backflush at set intervals in some visualized cases where filtration is quite difficult.

BRIEF DESCRIPTION OF THE INVENTION

The invention encompasses multiple rotatable hollow membrane covered filter discs mounted on a rotatable shaft in such a manner that the filtrate is drawn off from the center of the shaft and solids or sludge may be drawn off from the bottom of the unit with less dense fluids such as oil being drawn off from the top of the unit. The flow rate thru a unit varies with pore size of the membrane on the filter disc, total membrane filtration area, inlet and exit pressure differential, type of material being filtered, cleanliness of the disc surface and speed of movement of the membrane surface thru the liquid.

Prototype testing has shown that with the rotation speed to move the surface of the disc thru the liquid at a speed of over 20 ft./sec. that the disc filtration capacity will remain approximately constant over six hours.

The invention may be described as follows:

a. a compartmented cylindrical body containing a hollow rotatable shaft with openings in the shaft to communicate with the central chamber of hollow membrane covered filter discs mounted on said shaft with sealing rings to allow only liquid (filtrate) that comes thru the filters to enter the shaft; the membrane covering may be a sintered metal membrane alone or a sintered metal membrane covered with an adhering controlled pore size plastic membrane, b. a draw-off chamber with proper seals to allow draw off of material from the rotating hollow shaft, c. a draw-off from the top of the cylindrical body to draw-off lighter liquid such as oil that tends to travel toward the rotating shaft and travel upward thru vent pipes in the disc or thru the hub of each hollow membrane covered filter disc to the top of the vessel, d. a sludge or solids draw-off from the bottom section of the compartmented cylindrical body, e. a feed inlet manifold with a multiplicity of take off's thru the wall of the top compartment of the compartmented cylindrical vessel to jet feed into the liquid at intervals as close as between each pair of the hollow membrane-covered filter discs, f. means to measure the total feed to the unit and means such as a centrifugal pump to maintain feed pressure from 40 psi to above 100 psi, g. automatic valving and pressure means to allow flushing the filtrate from the unit backwards thru the hollow shaft and thru the controlled pore size membrane of the filter discs. During this operation feed flow would be stopped and either the sludge draw would be opened or alternatively means to direct the liquid from the filter unit to the feed tank could be used.

The details of a preferred embodiment of the total unit including the hollow membrane-covered filter disc and necessary seals around the rotating hollow shaft will become clear from the attached drawings and explanation thereof.

Minor changes may easily be made by one of normal skill in the mechanical arts and we mean only to be limited to the general design and spirit and purpose as outlined in these claims and specifications.

DETAILED DESCRIPTION OF THE DRAWINGS

Figure 1:
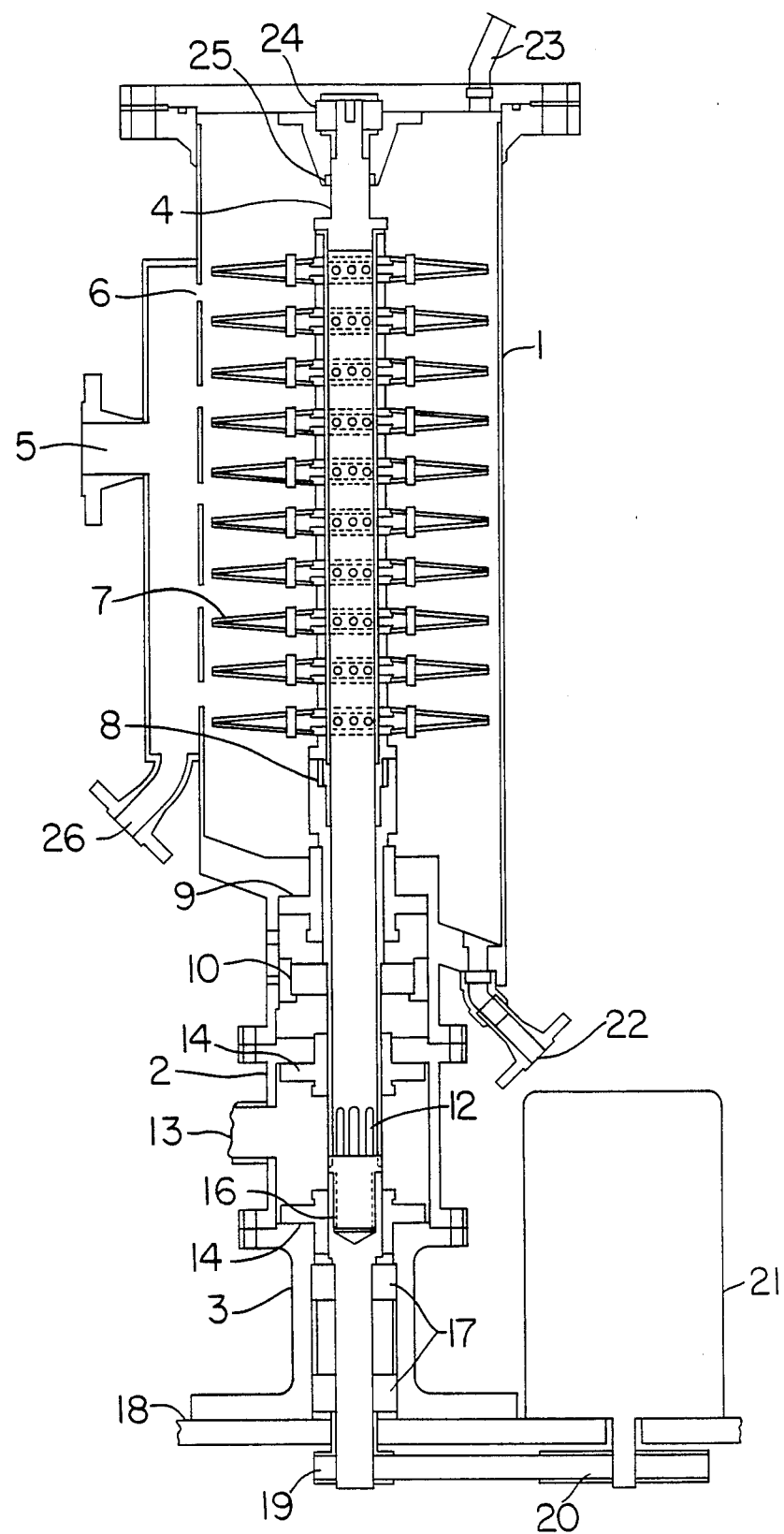
FIG. 1 shows the assembled unit with feed inlet manifold and with hub size of the disc and total disc size in relatively correct proportions.

In FIG. 1 we show the assembled unit comprising:

a. an upper body segment 1 containing the hollow rotary shaft 4 with inlet feed manifold 5 with a multiplicity of feed openings 6, that with the usual 50-100 psi feed pressure, jet feed between each pair of hollow membrane covered filter discs 7. The hollow rotary shaft 4 has a spline type disconnect 8 to allow easy removal and installation of the hollow rotary shaft 4 with the multiplicity of hollow membrane covered filter discs 7 mounted thereon. In this top segment we also have a double fluid seal 9 and an adjustable thrust bearing 10. Sludge drawn-off is thru opening 22 while oil or fluids lighter than water may be drawn off thru outlet 23. A clean out draw-off 26 may be used to return feed or back flushed liquid to the feed tank. We show O ring seals 25 to protect the upper shaft bearing 24, b. an intermediate body segment 2 contains double fluid seals 14 and the lower end of hollow rotary shaft 4 with openings 12 to allow filtrate to exit the unit thru filtrate discharge 13. A driver spline connection 16 drives the hollow rotary shaft 4 thru a drive shaft connected with drive gear 19. The drive shaft goes thru lower body segment 3 which also holds dual bearings 17 for the drive shaft which is connected to drive gear 19. Drive gear 19 is, in one embodiment, driven by motor drive gear 20 mounted on a drive shaft of motor 21. Belt drive, chain drive, or direct gear drives could all be used, c. the total unit is mounted on baseplate 18, the rotary drive shaft 4 may be belt or gear driven by a power source which could be a motor or a motive source driven by steam, electricity or fossil fuel.

FIG. 2, 3, 4, and 5, show details of the hollow membrane-covered filter disc.

Figure 2:
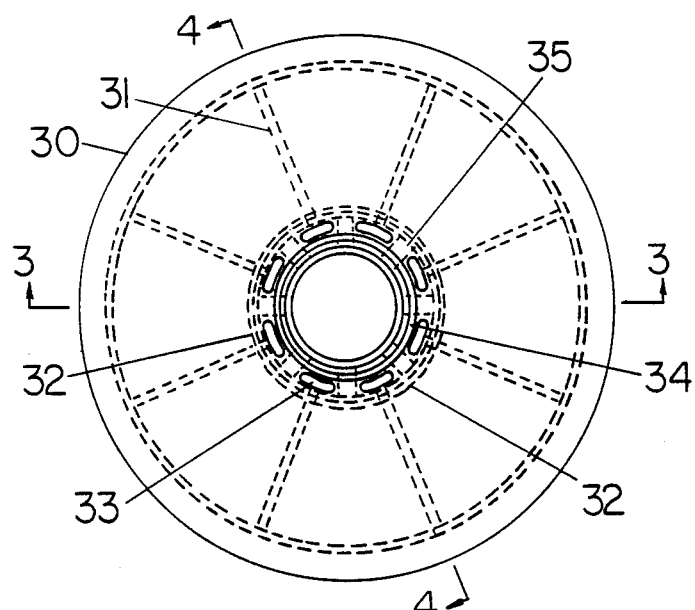
FIG. 2 shows a top view of the disc indicating vent pipes thru the hub and relative size of hub and disc

In FIG. 2 we show a top view of the hollow membrane covered filter disc 30. The hub 32 is large enough to have a shear velocity at the outer portions of the hub 32 of a minimum of 10 ft./sec. when the hollow rotatable mounting shaft 4 is rotated at 1350 rpm - in one embodiment. With 10 ft./sec. speed at one point on the hub 4 there is a very thin static layer on the disc 30 as it rotates. Rotation speed and size are interrelated to allow the surface of the membrane to move a minimum of 10 ft./sec. with a velocity of above 30 ft./sec being a normal or expected speed.

A multiplicity of vertical vent pipes or openings 33 in the peripheral part of hub 32 allow less dense fluids such as oil to travel upward toward the upper discharge nozzle 23, FIG. 1 with these vent pipes 33 also allowing lighter flocculent solids to move upward to prevent covering of a portion of the disc 30 with solids.

A multiplicity of horizontal openings 35 allow movement of filtrate from the interior of discs 30 to an open collector ring 34 that allows filtrate to move thru holes or openings at this point in shaft 4, FIG. 1 to the center portion of shaft 4 and down thru outlet holes 12, FIG. 1 to the filtrate exit.

Figure 3:
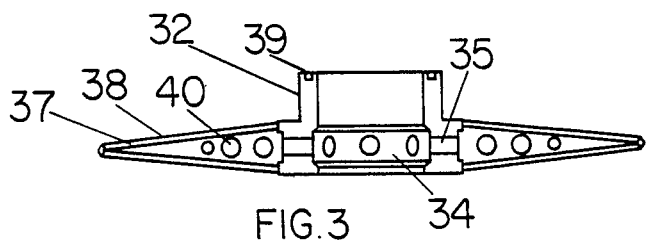
FIG. 3 shows a section A—A of the disc in FIG. 1 indicating the openings thru the hub leading to openings in the hollow mounting shaft thereby allow the open interior of the disc to communicate with the hollow mounting shaft interior.

FIG. 3 shows a section A—A to further elucidate the structure of disc 30, FIG. 2.

A section view AA shows two of a multiplicity of openings 35 that lead from the internal portions of disc 30, FIG. 2 to the interior of collector ring 34 which in turn allows filtrate flow into the hollow shaft 4, FIG. 1.

Also indicated are the inner support struts 31 with sintered metal membrane 37 with 2-50 micron openings, welded to struts 31.

The sintered metal membrane 37 is welded to the hub inner support struts 31 and, at the peripheral edge, to itself. A controlled pore size plastic membrane 38 may be fused to the surface and outer edge of the sintered metal membrane 37.

An O-ring seal 39 between each disc 30, FIG. 2 as it is positioned on shaft 4, FIG. 1 prevents leakage of unfiltered material into the hollow shaft 4.

Figure 4:
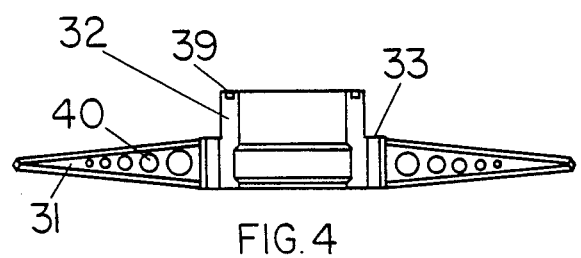
FIG. 4 shows section B—B of disc in FIG. 1 indicating the vertical vent pipes thru the hub to allow a lighter fluid such as oil to flow to an upper liquid draw off point.

FIG. 4, section B—B of FIG. 2, is showing two of a multiplicity of vertical vent openings or pipes 33 thru each hub 32 and also showing inner support struts 31 containing openings 40 so that filtrate in the disc 30 interior moves freely.

Figure 5:
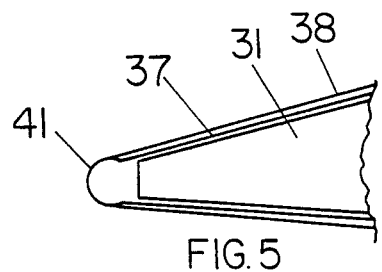
FIG. 5 shows an edge view of the disc wherein the sintered metal membrane is welded to an open bead ring that may act as an expansion joint.

FIG. 5 shows an end section of another embodiment of the outer peripheral edge of disc 30, wherein the sintered metal membrane 37 is welded to an open bead expansion joint 41. The porous controlled pore size plastic membrane 38 is fused to the sintered metal membrane 37. The drawing shows the layers 37 and 38 separated for clarity.

| No's | Legend - Drawings Description |
|---|---|
| FIG. 1 | |
| 1 | Filter body - feed segment |
| 2 | Filter body - draw off segment |
| 3 | Filter body - lower bearing & support segments |
| 4 | Hollow rotatable mounting shaft |
| 5 | Inlet manifold |
| 6 | One of multiple feed lines to feed between discs |
| 7 | One of multiple rotating membrane-covered hollow filter discs |
| 8 | Spline to allow removal of upper section of the rotatable hollow mounting shaft 4 |
| 9 | Double fluid seal |
| 10 | Adjustable thrust bearing |
| 12 | Discharge openings from center of shaft 4 |
| 13 | Filtrate effluent |
| 14 | Double seals |
| 16 | Spline drive joint |
| 17 | Bottom shaft bearing |
| 18 | Base plate |
| 19 | Shaft drive wheel |
| 20 | Drive gear |
| 21 | Drive motor |
| 22 | Sludge draw off |
| 23 | Oil draw off |
| 24 | Top bearing |
| 25 | O-ring seals |
| FIG. 2 | |
| 30 | Hollow membrane-covered filter disc |
| 31 | Inner support struts |
| 32 | Hub |
| 33 | One of multiple vent pipes |
| 34 | Collector ring or open interior hub 32 |
| 35 | One of multiple openings connecting interior of filter disc 30 with open interior 34 of hub 32 |
| FIG. 3 | |
| 31 | Inner support strut |
| 32 | Hub |
| 35 | Connecting openings between disc 30 interior and hub interior 34 |
| 37 | Sintered metal membrane - may be 2 to 50 micron pore size |
| 38 | Controlled pore size plastic membrane adhering to sintered metal membrane 37 |
| 39 | O ring seal between hubs 32 |
| FIG. 4 Shows section B-B of FIG. 2 | |
| 40 | Openings in inner support struts 31 |
| 33 | Vent pipes thru hub 32 |
| 39 | O ring seal between hubs 32 |
| FIG. 5 | |
| 41 | An open bead expansion joint edge used in one embodiment of disc 3 |
| 31 | Inner support strut |
| 37 | Sintered metal membrane |
| 38 | Controlled pore size plastic membrane covering fused to sintered metal membrane 37 |

What is claimed is:

1. A Multi-Purpose Rotating Membrane Filter Unit comprising:
   (a) a closed cylindrical body with an upper head and a lower mounting means;
   (b) a rotatable hollow shaft in said closed cylindrical body with sealing means in said upper head and said lower mounting means;
   (c) a power drive means to rotate said rotatable hollow shaft;
   (d) a plurality of membrane-covered hollow disc means mounted on said rotatable hollow shaft with the interior of said membrane-covered hollow disc means communicating with the interior of said rotatable hollow shaft;
   (e) a minimum of one vertical vent pipe through a doughnut shaped hub of each of said plurality of membrane-covered hollow disc means;
   (f) an exterior feed means to provide multiple feed points through a vertical axis of said closed cylindrical body;
   (g) means whereby materials may be withdrawn through said upper head and through a lower portion of said closed cylindrical body;
   (h) means whereby material may be withdrawn from the interior of said rotatable hollow shaft;
   (i) bearing support means in said closed cylindrical body for said rotatable hollow shaft.

2. A multi-purpose rotating membrane filter unit as in claim 1 wherein said hub of said membrane-covered hollow disc means has a minimum diameter that is one-fourth of said membrane covered hollow disc means diameter.

3. A Multi-Purpose Rotating Membrane Filter Unit as in claim 1 where said plurality of membrane-covered hollow disc means each comprise:
   (a) a multiplicity of stiffener ribs or equal length, and each containing a minimum of one hole and with each of said stiffener ribs fastened at one end to doughnut shaped hub to form an open interior double truncated cone shaped disc;
   (b) said doughnut shaped hub having an interior diameter a minimum of 0.030" greater than the outside diameter of a rotatable hollow shaft with said doughnut shaped hub containing interior lateral pipes to allow liquid to flow from between said stiffener ribs into openings contained in said rotatable hollow shaft when said plurality of membrane-covered hollow disc means are mounted on said rotatable hollow shaft and with said doughnut shaped hub further containing a multiplicity of open vertical pipes;
   (c) sintered metal membrane coverings for upper and lower edges of said stiffener ribs with said sintered metal membrane coverings fastened to said stiffener ribs and said hub and with an outer edge of said sintered metal membrane coverings welded to each other.

4. A Multi-Purpose Rotating Membrane Filter Unit as in claim 3 wherein said outer edge of each of said sintered metal membrane coverings is welded to a circumferential open expansion bead.

5. A Multi-Purpose Rotating Membrane Filter Unit as in claim 4 further comprising a controlled pore size plastic membrane covering adhering to each exterior side of said sintered metal membrane covering.

6. A Multi-Purpose rotating membrane filter unit as in claim 3 wherein controlled pore size plastic membrane covering is used instead of said sintered metal membrane.

7. A Multi-Purpose Rotating Membrane Filter Unit as in claim 1 wherein said exterior feed means is a manifold mounted to said closed cylindrical body with openings to provide feed between each pair of said plurality of membrane-covered hollow disc means.

8. A Multi-Purpose Rotary Membrane Filter unit as in claim 1 further comprising valving, back pulse piping and pump means to pump a portion of said material withdrawn from the interior of said rotatable hollow shaft back through said membrane covered hollow disc means.

9. A Multi-Purpose Rotating Membrane Filter Unit comprising:
(a) a rigidly mounted cylindrical body;
(b) a rotatable hollow shaft means in said rigidly mounted cylindrical body; p1 (c) a plurality of controlled pore size membrane-covered hollow disc means mounted on said rotatable hollow shaft means with openings in said rotatable hollow shaft means communicating with an interior of said controlled pore size membrane-covered hollow disc means;
(d) a first draw-off means in said rigidly mounted cylindrical body whereby material may be continuously removed from the upper part of said rigidly mounted cylindrical body;
(e) a second draw-off means in said rigidly mounted cylindrical body whereby material may be removed from a lower part of said rigidly mounted cylindrical body;
(f) a third draw-off means in said rigidly mounted cylindrical body whereby filtrate may be continuously removed from the interior of said rotatable hollow shaft means;
(g) a back pulse pump means connected with said third draw-off means wherein said filtrate may be periodically pressured to backflow through said controlled pore size membrane-covered hollow disc means,
(h) a feed manifold mounted on said rigidly mounted cylindrical body with exit openings from said feed manifold providing an inlet feed between each pair of said plurality of controlled pore size membrane-covered hollow disc means.

* * * * *

UNITED STATES PATENT AND TRADEMARK OFFICE
CERTIFICATE OF CORRECTION

PATENT NO. : 4,925,557

DATED : May 15, 1990

INVENTOR(S) : Walter E. Ahlberg, Jr., et al

It is certified that error appears in the above-identified patent and that said Letters Patent is hereby corrected as shown below:

On the title page item [76], line 3, change Walter F. Ahlberg, Jr. to Walter E. Ahlberg, Jr.

Signed and Sealed this

First Day of December, 1992

*Attest:*

DOUGLAS B. COMER

*Attesting Officer*     *Acting Commissioner of Patents and Trademarks*